United States Patent Office 3,142,199
Patented July 28, 1964

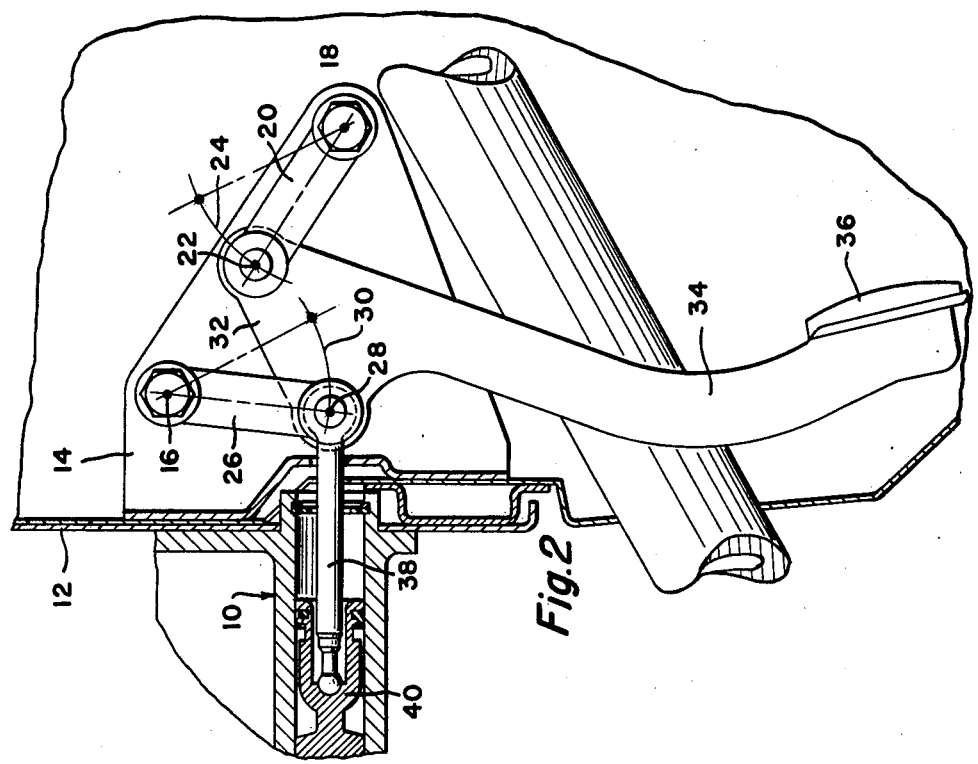
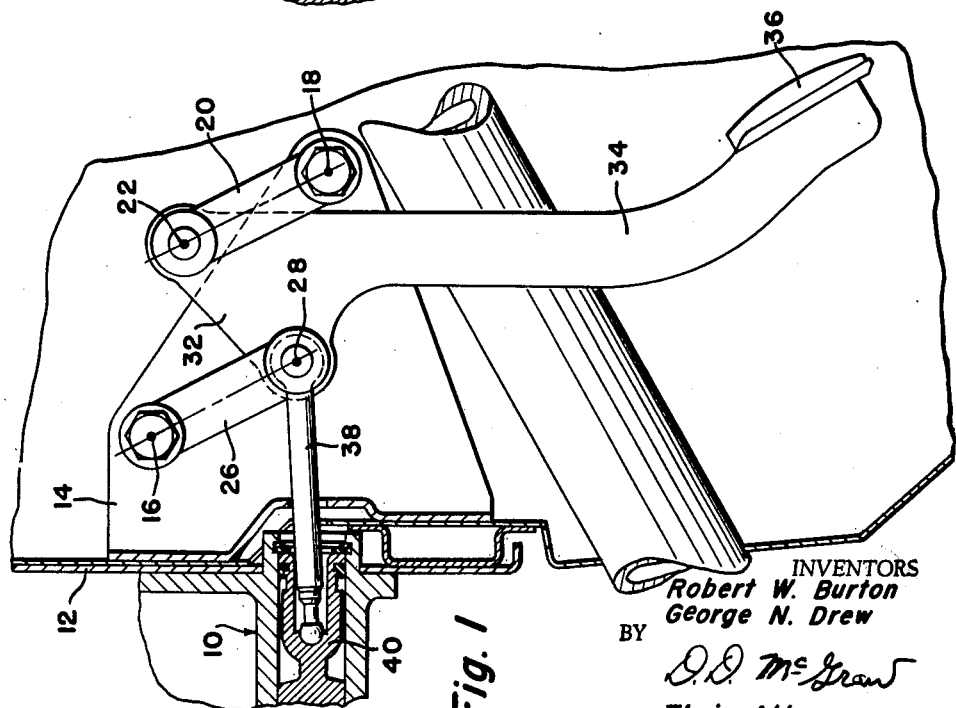

3,142,199
PEDAL MOUNTING ARRANGEMENT
Robert W. Burton, Farmington, Mich., and George N. Drew, Cleveland, Ohio, assignors to General Motors Corporation, Detroit, Mich., a corporation of Delaware
Filed Jan. 28, 1963, Ser. No. 254,100
3 Claims. (Cl. 74—516)

The invention relates to a pedal mounting arrangement, and more particularly to one wherein the output force of the pedal varies at an increasing ratio in relation to the input force as the pedal is actuated. The mounting arrangement is illustrated and described herein as part of a brake pedal linkage system, and includes pivoted links providing a toggle linkage, with the brake pedal lever arm being one of the links so that force applied to the brake pedal moves the center pivot of the toggle to spread it apart. One end of the toggle is held stationary, allowing only pivotal movement. The push rod for the brake master cylinder is pivotally connected to the other end of the toggle so that the ratio of input forces to output forces continually increases as the pedal is moved in the brake applying direction. A guide is provided for the movable end of the toggle and may take the form of a pivoting link with one end being attached to a stationary pivot and the other end being pivotally attached to the movable toggle end.

In the drawing:

FIGURE 1 illustrates the pedal mounting arrangement as part of a brake assembly, with the brake pedal in the released position. Parts are broken away and in section.

FIGURE 2 is similar to FIGURE 1 and shows the mechanism in the brake applied position.

The pedal mounting arrangement is illustrated as being part of a brake system for a vehicle. It has been found desirable to have the initial force transmitted to a brake master cylinder to be less per unit of brake pedal travel than the final forces, and to have the output force/input force ratio increase as the brake pedal is moved toward the full apply position. The mounting arrangement of the drawings includes a brake master cylinder assembly 10 suitably mounted on a vehicle firewall 12. A mounting bracket 14 is also secured to the firewall 12. Stationary pivots 16 and 18 are provided in spaced relation on bracket 14. A link 20 is secured to pivot 18 at one end and its other end is provided with a pivot 22 which is movable about pivot 18 along the arc 24. A link 26 is attached to pivot 16 at one end and its other end is provided with a pivot 28 which is movable about pivot 16 along the arc 30. A link 32, which may be part of the brake pedal lever arm 34 to which the brake pedal 36 is attached, is pivotally attached at its opposite ends to pivots 22 and 28 so that these ends move along arcs 24 and 30, respectively. A push rod 38 is pivotally attached to pivot 28 and engages the master cylinder piston 40 to transmit forces therebetween. The usual master cylinder piston return spring will urge push rod 38 to the rear and hold the brake pedal in the position shown in FIGURE 1.

When the vehicle operator pushes against the pedal 36 with his foot, he causes pivot 28 to move along the arc 30 and pivot 22 to move along the arc 24, thus forcing push rod 38 to the left as seen in the drawing to pressurize fluid in the master cylinder 10. The pivots 18, 22 and 28, and links 20 and 32 cooperate to provide a toggle linkage arrangement with a stationary end at pivot 18, a movable end at pivot 28 and a center joined at pivot 22. Brake apply movement of the lever arm 34 causes pivot 22 to move toward a position in line with and between pivot 18 and pivot 28, thus obtaining an increasing ratio of forces exerted through push rod 38 in relation to the force applied to the brake pedal 36.

In a typical installation where four inches of pedal travel may be obtained, the mechanical advantage may continually vary, for example, from a 1:1 ratio at the zero point of pedal travel to approximately a 4:1 ratio when the full pedal travel is obtained. The mechanical advantage continually varies in an increasing direction with an increase in pedal travel. Thus a more gradual engagement of the brakes during normal stops is obtained which will lessen the lurching effect of sensitive brakes and will lessen the additional effort required for full braking in the case of emergency stops.

What is claimed is:

1. A pedal mounting arrangement comprising a toggle linkage having a stationary end pivot and a movable end pivot and a movable center pivot with a first link joining said stationary end pivot and said movable center pivot and a second link joining said movable end pivot and said movable center pivot, a mounting bracket having said stationary end pivot thereon, a pedal attached to said second link, a guide link pivotally attached to said movable end pivot and to said mounting bracket, and an output link secured to said movable end pivot.

2. A pedal mounting arrangement comprising a mounting bracket, spaced stationary pivots on said mounting bracket, first and second links having one end respectively pivotally attached to said spaced first and second pivots, a third link having the opposite ends thereof pivotally attached to the other ends of said first and second links whereby said second and third links form a toggle linkage and said first link provides a guide therefor, said second and third links having a normal position wherein the pivots directly associated therewith are triangularly positioned, pedal means for moving said third link to move one of the pivots, attached thereto toward an in-line position with the other pivots associated with said second and third links, and an output link attached to the pivot joining said first and third links, whereby force exerted on said third link is transmitted to said output link in a continually increasing ratio.

3. A brake pedal mounting arrangement for continually increasing the brake input force in relation to the brake pedal force, said arrangement comprising linkage forming a toggle and including a brake pedal lever arm, one end of said toggle being stationary and the other end being movable, a brake master cylinder push rod attached to said toggle movable end, and means guiding said toggle movable end as said toggle is actuated by movement of said brake pedal lever arm.

References Cited in the file of this patent
UNITED STATES PATENTS 2,566,891    Hufferd ---------------- Sept. 4, 1951
2,884,803    Willis ------------------ May 5, 1959